US011906961B2

(12) United States Patent
Gariepy et al.

(10) Patent No.: US 11,906,961 B2
(45) Date of Patent: Feb. 20, 2024

(54) SYSTEMS AND METHODS FOR UNMANNED VEHICLES HAVING SELF-CALIBRATING SENSORS AND ACTUATORS

(71) Applicant: Clearpath Robotics Inc., Kitchener (CA)

(72) Inventors: Ryan Christopher Gariepy, Kitchener (CA); Kareem Shehata, Kitchener (CA); Prasenjit Mukherjee, Mississauga (CA); Anthony Tod, St. Agatha (CA); Teyvonia Thomas, Kitchener (CA); Yan Ma, Waterloo (CA)

(73) Assignee: CLEARPATH ROBOTICS INC., Kitchener (CA)

( * ) Notice: Subject to any disclaimer, the term of this patent is extended or adjusted under 35 U.S.C. 154(b) by 454 days.

(21) Appl. No.: 17/220,111

(22) Filed: Apr. 1, 2021

(65) Prior Publication Data

US 2021/0286351 A1    Sep. 16, 2021

Related U.S. Application Data

(63) Continuation of application No. 16/011,760, filed on Jun. 19, 2018, now Pat. No. 10,990,093, which is a
(Continued)

(51) Int. Cl.
*G05D 1/00*      (2006.01)
*G05D 1/02*      (2020.01)

(52) U.S. Cl.
CPC .......... *G05D 1/0011* (2013.01); *G05D 1/024* (2013.01); *G05D 1/0246* (2013.01); *G05D 2201/0216* (2013.01)

(58) Field of Classification Search
None
See application file for complete search history.

(56) References Cited

U.S. PATENT DOCUMENTS 5,204,814 A    4/1993  Noonan et al.
5,528,888 A    6/1996  Miyamoto et al.
(Continued)

OTHER PUBLICATIONS

Akametalu, Anayo, K., "Reachability-Based Safe Learning with Gaussian Processes," Proceedings of the 53rd IEEE Conference on Decision and Control (2014).

*Primary Examiner* — Jonathan M Dager

(57) ABSTRACT

Systems and methods of unmanned vehicles having self-calibrating sensors and actuators are provided. The unmanned vehicle comprises a communication interface and a processor for controlling a propulsion system of the vehicle and receiving sensor data from one or more sensors of the vehicle. The processor is configured to operate in a guided calibration mode by controlling the propulsion system according to commands received from an external guided control system, while processing the sensor data to determine a degree of certainty on a calibration the sensor data and a position of the vehicle. The processor determines that the degree of certainty is above a threshold value associated with safe operation of the propulsion system in an autonomous calibration mode, and subsequently switch operation of the propulsion system to the autonomous calibration mode based on the determination that the degree of certainty is above the threshold value.

20 Claims, 6 Drawing Sheets

Related U.S. Application Data continuation of application No. 15/691,643, filed on Aug. 30, 2017, now Pat. No. 10,012,981, which is a continuation of application No. 14/879,210, filed on Oct. 9, 2015, now Pat. No. 9,804,594.

(60) Provisional application No. 62/076,569, filed on Nov. 7, 2014.

(56) References Cited

U.S. PATENT DOCUMENTS

| | | |
|---|---|---|
| 5,559,695 A | 9/1996 | Daily |
| 6,255,793 B1 | 7/2001 | Peless et al. |
| 6,338,013 B1 | 1/2002 | Ruffner |
| 6,459,955 B1 | 10/2002 | Bartsch et al. |
| 6,611,738 B2 | 8/2003 | Ruffner |
| 6,615,108 B1 | 9/2003 | Peless et al. |
| 7,076,348 B2 | 7/2006 | Bucher et al. |
| 7,103,457 B2 | 9/2006 | Dean |
| 7,110,881 B2 | 9/2006 | Gray et al. |
| 7,239,944 B2 | 7/2007 | Dean |
| 7,319,920 B2 | 1/2008 | Donoso et al. |
| 7,689,321 B2 * | 3/2010 | Karlsson ............... G05D 1/0246 701/28 |
| 7,756,624 B2 | 7/2010 | Diekhans et al. |
| 8,046,103 B2 | 10/2011 | Abramson et al. |
| 8,204,654 B2 | 6/2012 | Sachs et al. |
| 8,239,083 B2 | 8/2012 | Durkos et al. |
| 8,428,778 B2 | 4/2013 | Landry et al. |
| 8,515,578 B2 * | 8/2013 | Chiappetta ........... G05D 1/0272 700/254 |
| 8,666,550 B2 | 3/2014 | Anderson et al. |
| 8,961,695 B2 * | 2/2015 | Romanov ............ A47L 11/4011 15/340.1 |
| 9,008,918 B2 | 4/2015 | Missotten et al. |
| 9,020,637 B2 * | 4/2015 | Schnittman ......... G05D 1/0227 382/106 |
| 9,020,757 B2 | 4/2015 | Peake et al. |
| 9,043,951 B2 | 6/2015 | Tolstedt et al. |
| 9,072,218 B2 | 7/2015 | Johnson et al. |
| 9,137,943 B2 | 9/2015 | Einecke et al. |
| 9,168,922 B1 | 10/2015 | Martin |
| 9,181,660 B2 | 11/2015 | Fritz et al. |
| 9,258,942 B2 * | 2/2016 | Biber ................... A01D 34/008 |
| 9,534,899 B2 * | 1/2017 | Gutmann ............... G01S 17/06 |
| 9,538,702 B2 * | 1/2017 | Balutis ................ A01D 34/008 |
| 9,891,630 B2 * | 2/2018 | Gariepy ............... G05D 1/0022 |
| 10,585,440 B1 * | 3/2020 | Gariepy ..................... B66F 9/24 |
| 10,793,369 B2 * | 10/2020 | Sekich ................... B65G 43/08 |
| 10,809,071 B2 * | 10/2020 | Afrouzi ................. G01S 17/89 |
| 10,809,734 B2 * | 10/2020 | De Castro ........... G05D 1/0088 |
| 10,824,159 B2 * | 11/2020 | Bautista .................. G01L 1/122 |
| 11,274,929 B1 * | 3/2022 | Afrouzi ............... G05D 1/0219 |
| 11,524,846 B2 * | 12/2022 | Cesic .................... G06Q 50/28 |
| 11,586,211 B2 * | 2/2023 | Kim ........................ B25J 19/02 |
| 2001/0022506 A1 | 9/2001 | Peless et al. |
| 2003/0018423 A1 | 1/2003 | Saller et al. |
| 2003/0110649 A1 | 6/2003 | Hudgens et al. |
| 2003/0144774 A1 | 7/2003 | Trissel et al. |
| 2004/0010343 A1 | 1/2004 | Dean |
| 2004/0193348 A1 | 9/2004 | Gray et al. |
| 2005/0038578 A1 | 2/2005 | McMurtry et al. |
| 2005/0182518 A1 * | 8/2005 | Karlsson ................ G06V 10/84 700/253 |
| 2005/0197766 A1 | 9/2005 | Flann et al. |
| 2006/0012493 A1 * | 1/2006 | Karlsson .............. G05D 1/0274 701/532 |
| 2006/0090438 A1 | 5/2006 | Hunt et al. |
| 2006/0175541 A1 | 8/2006 | Eglington et al. |
| 2007/0208442 A1 | 9/2007 | Perrone |
| 2008/0039974 A1 | 2/2008 | Sandin et al. |
| 2008/0039991 A1 | 2/2008 | May et al. |
| 2008/0049217 A1 | 2/2008 | Cappelletti |
| 2008/0109129 A1 | 5/2008 | Yanagida et al. |
| 2008/0167753 A1 | 7/2008 | Peless et al. |
| 2009/0055019 A1 | 2/2009 | Stiehl et al. |
| 2010/0063626 A1 | 3/2010 | Anderson |
| 2010/0063648 A1 | 3/2010 | Anderson |
| 2010/0063954 A1 | 3/2010 | Anderson |
| 2010/0324731 A1 * | 12/2010 | Letsky ................. G05D 1/0274 901/1 |
| 2011/0167574 A1 * | 7/2011 | Stout ................... G05D 1/0234 701/25 |
| 2011/0202175 A1 * | 8/2011 | Romanov .................. B25J 5/00 700/250 |
| 2011/0202224 A1 | 8/2011 | Thompson et al. |
| 2011/0295424 A1 | 12/2011 | Johnson et al. |
| 2012/0212638 A1 | 8/2012 | Schepelmann et al. |
| 2013/0006419 A1 | 1/2013 | Bergstrom et al. |
| 2013/0066484 A1 | 3/2013 | Markusson et al. |
| 2013/0226344 A1 * | 8/2013 | Wong ..................... B25J 9/1694 901/1 |
| 2015/0006005 A1 * | 1/2015 | Yu ........................... B60P 3/007 701/22 |
| 2015/0153444 A1 * | 6/2015 | Nichols .................. G01S 13/86 342/385 |
| 2015/0158174 A1 | 6/2015 | Romanov et al. |
| 2016/0076892 A1 | 3/2016 | Zhou et al. |
| 2016/0124434 A1 | 5/2016 | Gariepy et al. |
| 2016/0223647 A1 * | 8/2016 | Nichols .................. G01S 13/89 |
| 2016/0271795 A1 * | 9/2016 | Vicenti ................. G05D 1/0219 |
| 2016/0349749 A1 * | 12/2016 | Gariepy ............... G05D 1/0274 |
| 2020/0215694 A1 * | 7/2020 | Song ..................... G05D 1/0219 |
| 2020/0225673 A1 * | 7/2020 | Ebrahimi Afrouzi ........... G05D 1/0044 |
| 2020/0237176 A1 * | 7/2020 | Bassa .................... G06F 18/2414 |
| 2022/0026920 A1 * | 1/2022 | Ebrahimi Afrouzi .. G06N 3/006 |

* cited by examiner

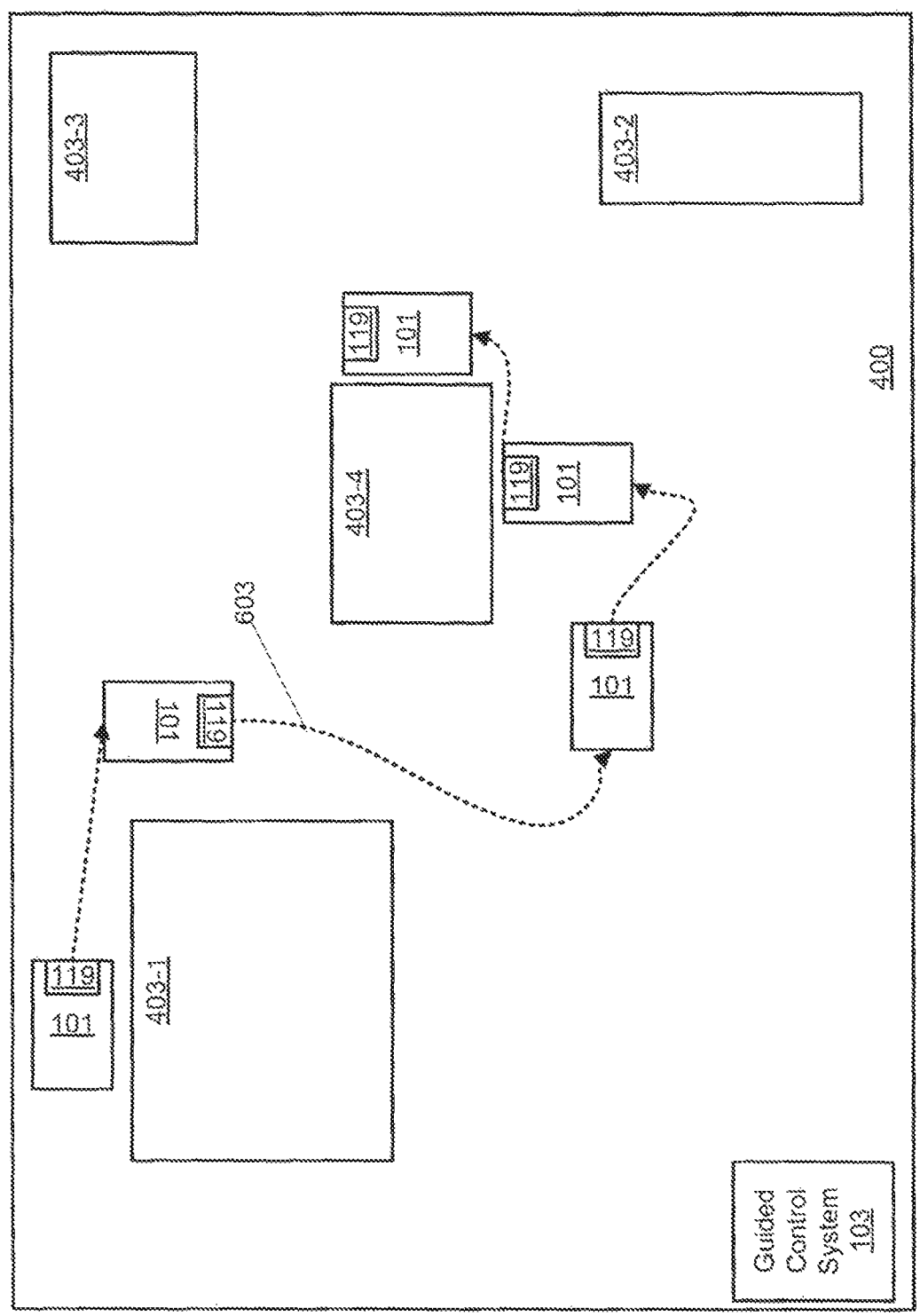

SYSTEMS AND METHODS FOR UNMANNED VEHICLES HAVING SELF-CALIBRATING SENSORS AND ACTUATORS

CROSS-REFERENCE TO RELATED APPLICATIONS

This application is a continuation of, U.S. patent application Ser. No. 16/011,760, filed on Jun. 19, 2018, that is a continuation of, U.S. patent application Ser. No. 15/691,643 and issued as U.S. Pat. No. 10,012,981, titled "Self-Calibrating Sensors and Actuators for Unmanned Vehicles" that is a continuation of U.S. patent application Ser. No. 14/879,210, filed on Oct. 9, 2015 and issued as U.S. Pat. No. 9,804,594, titled "Self-Calibrating Sensors and Actuators for Unmanned Vehicles", which claims the benefit of the filing date of U.S. provisional patent application No. 62/076,569; all of which are herein incorporated by reference in their entireties for all purposes.

TECHNICAL FIELD

The specification relates generally to unmanned vehicles ("UVs"), and specifically to self-calibrating of sensors and actuators for unmanned vehicles.

BACKGROUND

When an unmanned vehicle ("UV") is developed and/or deployed for the first time, and/or at a new location, calibrations are required to ensure that the UV can operate safely within the environment of the new location. Such calibrations are generally implemented manually, and usually by a skilled technician who travels to the new location in order to ensure that the calibration is done correctly, as employees at the new location are generally not specialized in robotics and/or unmanned vehicles, and/or the calibration of such. Furthermore, whenever an error occurs and/or whenever calibration of the UV fails, the skilled technician must again travel to the location to again perform the calibration. Such a situation can be expensive, and/or can leave an entity associated with the location without use of the UV for lengthy periods.

SUMMARY

The present specification provides an unmanned vehicle ("UV") that is configured to automatically self-calibrate sensors and/or actuators thereof. For example, the UV according to the present specification is configured to operate in various calibration modes, and automatically switch there between when degree of certainty thresholds are met. Such calibration modes can include a guided calibration mode and an autonomous calibration mode, and automatic transition to a next mode occurs when a uncertainty propagation model used to analyze sensor data, and/or a location of the UV, reaches respective threshold values, each respective threshold value representing an increasing amount to certainty on the sensor data, and/or a position of the UV. Prior to the guided calibration mode, the UV can enter a capability enumeration mode in which capabilities of the UV are enumerated. For example, in the capability enumeration mode a determination of which sensors are present at the UV occurs. The UV automatically switches to the guided calibration mode when an enumeration of the unmanned vehicle capabilities supports and/or meets and/or reaches a performance level threshold stored at the memory. In the guided calibration mode, commands are received at a communication interface from one or more external guidance devices, to cause the UV to move around an environment collecting sensor data and/or a location of the UV. Once the certainty reaches a first threshold value, such that the UV can operate safely in the environment without the use of an external guidance system, the UV automatically switches to the autonomous calibration mode. In the autonomous calibration mode the UV automatically moves around the environment (i.e. without receiving commands from the external guidance system), continuing to collect sensor data, until the certainty on the sensor data, and/or a location of the UV, reaches a second threshold value, associated with desired and/or predetermined performance levels of the UV. The UV then automatically switches to an operational mode where it can carry out tasks within the environment. In the operational mode, the UV can monitor its own behaviour and/or the quality of the sensor data and when the quality of the sensor data drops below a threshold value, the UV can re-enter the capability enumeration mode and/or the guided calibration mode. Such a drop in sensor data quality can occur when sensors fail and/or when the environment changes, and the like.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

In this specification, elements may be described as "automatically" performing given functions. In general, an element that "automatically" performs given functions can perform those functions without interference by and/or assistance of a human being and/or a user, unless otherwise specified.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, ZZ, and the like). Similar logic can be applied for two or more items in any occurrence of "at least one . . . " and "one or more . . . " language.

An aspect of the specification provides an unmanned vehicle comprising: a chassis; a propulsion system configured to move the chassis; one or more sensors configured to sense features around the chassis; a memory; a communication interface; and a processor configured to: operate the propulsion system in a guided calibration mode by: receiving, using the communication interface, one or more commands from an external guided control system; moving, using the propulsion system, the chassis according to the commands; collecting sensor data from the one or more sensors while implementing the commands; and, processing the sensor data using one or more uncertainty models to determine at least one degree of certainty on a calibration of one or more of the sensor data and a position of the chassis; automatically switch operation of the propulsion system to an autonomous calibration mode when the degree of certainty is above a first threshold value associated with safe operation of the propulsion system in the autonomous calibration mode; thereafter, operate the propulsion system in the autonomous calibration mode by: automatically moving, using the propulsion system, the chassis; collecting the sensor data from the one or more sensors while automatically moving the chassis using the propulsion system; and, further processing the sensor data using one or more uncertainty propagation models to determine at least one further degree of certainty on the calibration; and, automatically switch operation of the propulsion system to an operational mode when the degree of certainty is above a second threshold value greater than the first threshold value.

The processor can be further configured to, prior to entering the guided calibration mode, enumerate unmanned vehicle capabilities, by one or more of: receiving, using the communication interface, a weight of the unmanned vehicle; receiving, with the weight, an indication of accuracy of the weight; receiving, using the communication interface, dimensions of the unmanned vehicle; receiving, with the dimensions, a respective indication of accuracy of the dimensions of the unmanned vehicle; autodetecting each of the one or more sensors; receiving, using the communication interface, a list of the one or more sensors; and using a scanner to scan one or more graphical identifiers of the one or more sensors. The processor can be further configured to automatically switch to a transition to the guided calibration mode when an enumeration of the unmanned vehicle capabilities supports a performance level threshold stored at the memory.

The processor can be further configured to automatically switch to one or more of an error mode and an autorecovery mode when an error is detected in the operational mode, by: stopping, using the propulsion system, movement of the chassis; and, automatically switching to one or more of an enumerate capability mode and the guided calibration mode. The error can be based on one or more of: a boundary of an estimated parameter; and, a rate of change of the estimated parameter.

The processor can be further configured to process the sensor data using one or more uncertainty propagation models to determine the at least one degree of certainty and the at least one further degree of certainty to determine one or more of: a respective calibration of a relationship between uncertainty on sensor measurements with respect to the position of the chassis; a respective location of each of the one or more sensors with respect to the chassis; a respective orientation of each of the one or more sensors with respect to the chassis; and, one or more of respective shapes and respective locations of sensed features.

The first threshold value and the second threshold value can each comprise a respective constraint on one or more of: a control algorithm, a mapping algorithm, a localization algorithm, at least one performance capability, and at least one current probability distribution.

The one or more sensors can comprise one or more of: one or more cameras, one or more LIDAR (Light Detection and Ranging) devices, one or more laser sensing devices, one or more radar devices, one or more accelerometers, and one or more magnetometers.

The calibration of the sensor data can comprise a respective calibration of a respective position of each of the one or more sensors with respect to the chassis.

Another aspect of the specification provides a method comprising: operating, using a processor of an unmanned vehicle, a propulsion system of the unmanned vehicle in a guided calibration mode, the unmanned vehicle comprising: a chassis; the propulsion system configured to move the chassis; one or more sensors configured to sense features around the chassis; a memory; a communication interface, and the processor, the operating the propulsion system in the guided calibration mode comprising: receiving, using the communication interface, one or more commands from an external guided control system; moving, using the propulsion system, the chassis according to the commands; collecting sensor data from the one or more sensors while implementing the commands; and, processing the sensor data using one or more uncertainty models to determine at least one degree of certainty on a calibration of one or more of the sensor data and a position of the chassis; automatically switching, using the processor, operation of the propulsion system to an autonomous calibration mode when the degree of certainty is above a first threshold value associated with safe operation of the propulsion system in the autonomous calibration mode; thereafter, operating, using the processor, the propulsion system in the autonomous calibration mode by: automatically moving, using the propulsion system, the chassis; collecting the sensor data from the one or more sensors while automatically moving the chassis using the propulsion system; and, further processing the sensor data using one or more uncertainty propagation models to determine at least one further degree of certainty on the calibration; and, automatically switching, using the processor, operation of the propulsion system to an operational mode when the degree of certainty is above a second threshold value greater than the first threshold value.

The method can further comprise, prior to entering the guided calibration mode, enumerating, using the processor, unmanned vehicle capabilities, by one or more of: receiving, using the communication interface, a weight of the unmanned vehicle; receiving, with the weight, an indication of accuracy of the weight; receiving, using the communication interface, dimensions of the unmanned vehicle; receiving, with the dimensions, a respective indication of accuracy of the dimensions of the unmanned vehicle; autodetecting each of the one or more sensors; receiving, using the communication interface, a list of the one or more sensors; and using a scanner to scan one or more graphical identifiers of the one or more sensors.

The method can further comprise automatically switching, using the processor, to a transition to the guided calibration mode when an enumeration of the unmanned vehicle capabilities supports a performance level threshold stored at the memory.

The method can further comprise automatically switching, using the processor, to one or more of an error mode and an autorecovery mode when an error is detected in the operational mode, by: stopping, using the propulsion system, movement of the chassis; and, automatically switching to one or more of an enumerate capability mode and the guided calibration mode. The error can be based on one or more of: a boundary of an estimated parameter; and, a rate of change of the estimated parameter.

The method can further comprise processing, using the processor, the sensor data using one or more uncertainty propagation models to determine the at least one degree of certainty and the at least one further degree of certainty to determine one or more of: a respective calibration of a relationship between uncertainty on sensor measurements with respect to the position of the chassis; a respective location of each of the one or more sensors with respect to the chassis; a respective orientation of each of the one or more sensors with respect to the chassis; and, one or more of respective shapes and respective locations of sensed features.

The first threshold value and the second threshold value can each comprise a respective constraint on one or more of: a control algorithm, a mapping algorithm, a localization algorithm, at least one performance capability, and at least one current probability distribution.

The one or more sensors can comprise one or more of: one or more cameras, one or more LIDAR (Light Detection and Ranging) devices, one or more laser sensing devices, one or more radar devices, one or more accelerometers, and one or more magnetometers.

The calibration of the sensor data can comprise a respective calibration of a respective position of each of the one or more sensors with respect to the chassis.

Yet a further aspect of the specification comprises a computer program product, comprising a computer usable medium having a computer readable program code adapted to be executed to implement a method comprising: operating, using a processor of an unmanned vehicle, a propulsion system of the unmanned vehicle in a guided calibration mode, the unmanned vehicle comprising: a chassis; the propulsion system configured to move the chassis; one or more sensors configured to sense features around the chassis; a memory; a communication interface, and the processor, the operating the propulsion system in the guided calibration mode comprising: receiving, using the communication interface, one or more commands from an external guided control system; moving, using the propulsion system, the chassis according to the commands; collecting sensor data from the one or more sensors while implementing the commands; and, processing the sensor data using one or more uncertainty models to determine at least one degree of certainty on a calibration of one or more of the sensor data and a position of the chassis; automatically switching, using the processor, operation of the propulsion system to an autonomous calibration mode when the degree of certainty is above a first threshold value associated with safe operation of the propulsion system in the autonomous calibration mode; thereafter, operating, using the processor, the propulsion system in the autonomous calibration mode by: automatically moving, using the propulsion system, the chassis; collecting the sensor data from the one or more sensors while automatically moving the chassis using the propulsion system; and, further processing the sensor data using one or more uncertainty propagation models to determine at least one further degree of certainty on the calibration; and, automatically switching, using the processor, operation of the propulsion system to an operational mode when the degree of certainty is above a second threshold value greater than the first threshold value. The computer usable medium can comprise a non-transitory computer usable medium.

BRIEF DESCRIPTION OF THE DRAWINGS

For a better understanding of the various implementations described herein and to show more clearly how they may be carried into effect, reference will now be made, by way of example only, to the accompanying drawings in which:

FIG. 6 depicts the unmanned vehicle operating in an autonomous calibration mode within the environment of FIG. 4, according to non-limiting implementations.

DETAILED DESCRIPTION

Figure 1:
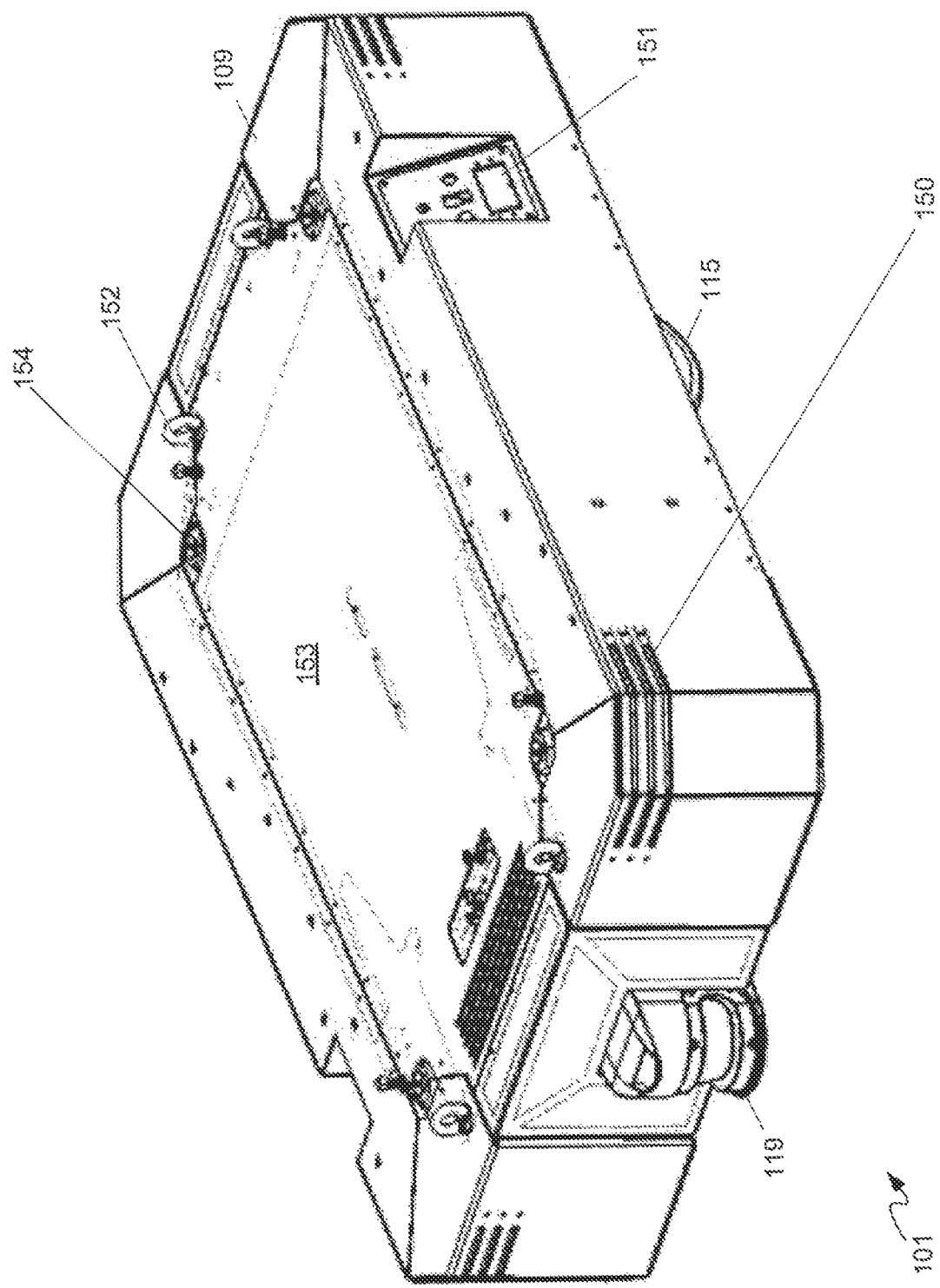
FIG. 1 depicts external characteristics features of an unmanned vehicle, according to non-limiting implementations.
Figure 2:
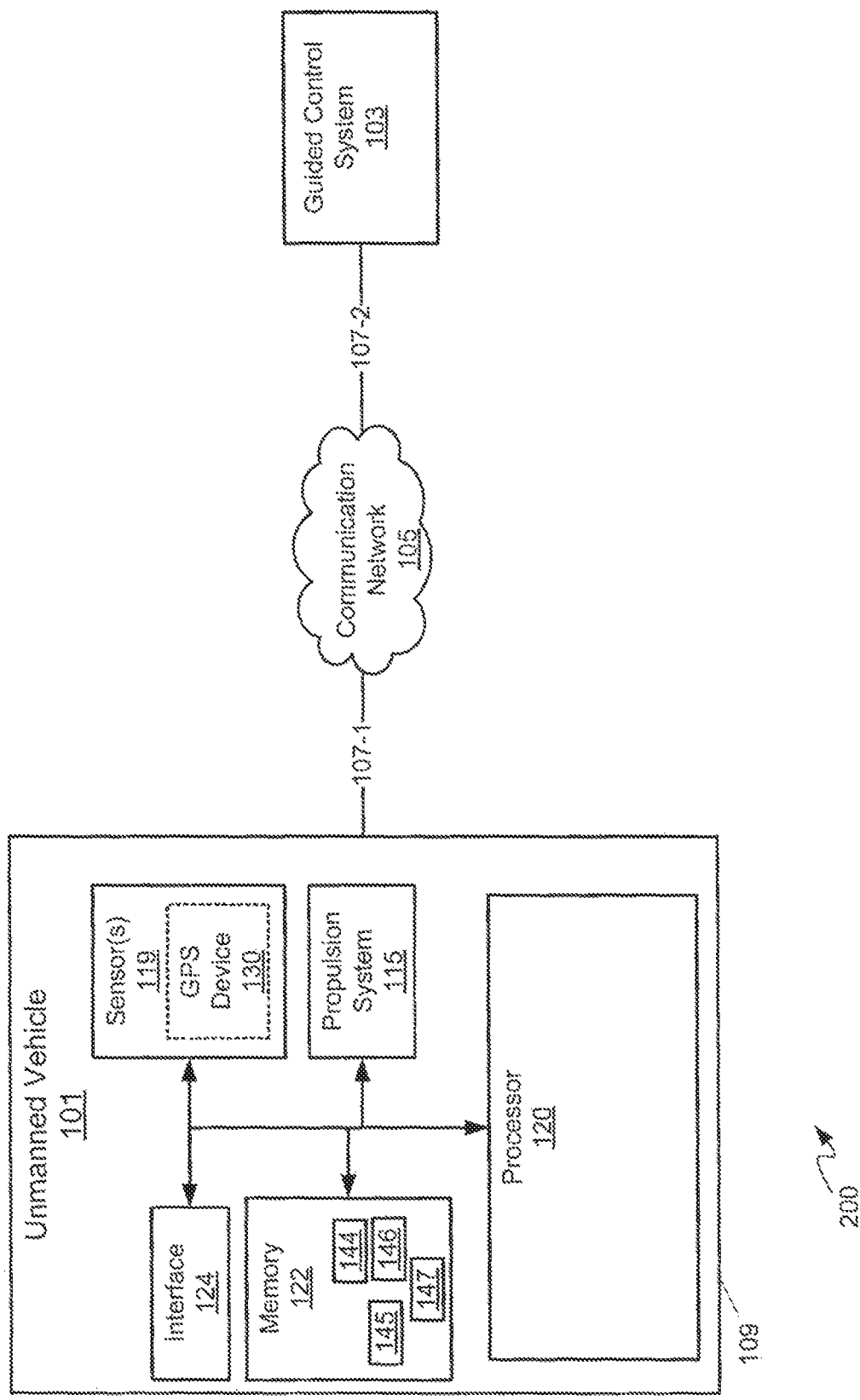
FIG. 2 depicts a schematic block diagram of a system that includes the unmanned vehicle of FIG. 1, according to non-limiting implementations.

FIG. 1 depicts external features of an unmanned vehicle 101; and FIG. 2 depicts a schematic diagram of a system 200 that includes unmanned vehicle 101, an external guided control system 103 and a communication network 105 (interchangeably referred to hereafter as network 105), according to non-limiting implementations, in communication via links 107-1, 107-2 (interchangeably referred to hereafter, collectively, as links 107 and, generically, as a link 107). In general, each of links 107 can be wireless links. Unmanned vehicle 101 comprises: a chassis 109; a propulsion system 115 configured to move chassis 109 and/or unmanned vehicle 101; one or more sensors 119 configured to sense features around chassis 109; a processor 120; and a memory 122; and, a communication interface 124 (interchangeable referred to hereafter as interface 124).

As depicted, one or more sensors can comprises an optional Global Positioning System (GPS) device 130 configured to determine a location of chassis 109 and/or unmanned vehicle 101 within an environment within which chassis 109 and/or unmanned vehicle 101 is to move, as described in further detail below.

Processor 120 is generally configured to: operate propulsion system 115 in a guided calibration mode by: receiving, using communication interface 124, one or more commands from external guided control system 103; moving, using propulsion system 115, chassis 109 according to the commands; collecting sensor data from one or more sensors 119 while implementing the commands; and, processing the sensor data using one or more uncertainty models to determine at least one degree of certainty on a calibration of one or more of the sensor data and a position of chassis 109; automatically switch operation of propulsion system 115 to an autonomous calibration mode when the degree of certainty is above a first threshold value associated with safe operation of propulsion system 115 in the autonomous calibration mode; thereafter, operate propulsion system 115 in the autonomous calibration mode by: automatically moving, using propulsion system 115, chassis 109; collecting the sensor data from one or more sensors 119 while automatically moving chassis 109 using propulsion system 115; and, further processing the sensor data using one or more uncertainty propagation models to determine at least one further degree of certainty on the calibration; and, automatically switch operation of propulsion system 115 to an operational mode when the degree of certainty is above a second threshold value greater than the first threshold value.

Unmanned vehicle 101 can generally comprise one or more of a robot, an unmanned ground vehicle, an unmanned aerial vehicle, an unmanned surface vehicle, an unmanned watercraft, an unmanned underwater and/or undersea vehicle, an unmanned spacecraft, aquatic vehicles, amphibious vehicles, aeronautic vehicles any other suitable vehicle, and/or a combination, and the like, configured to receive commands from external guided control system 103 via network 105 and links 107 to move to a given coordinate and/or perform a given task, and implement movement to the given coordinate and/or performance of the given task without person on board. In other words, unmanned vehicle 101 can comprise a remote controlled and/or remote guided vehicles and/or an autonomous vehicle that can operate without human intervention in the environment.

Each of links 107 can comprise any suitable links for enabling unmanned vehicle 101 and external guided control system 103 to communicate using network 105. Links 107 can hence each include any suitable combination of wired and/or wireless links, wired and/or wireless devices and/or wired and/or wireless networks, including but not limited to any suitable combination of USB (universal serial bus) cables, serial cables, wireless links, cell-phone links, cellular network links (including but not limited to 2G, 2.5G, 3G, 4G+, and the like) wireless data, Bluetooth links, NFC (near field communication) links, WiFi links, WiMax links, packet based links, the Internet, analog networks, the PSTN (public switched telephone network), WiFi access points, and the like, and/or a combination. However, at least link 107-1 can be generally wireless so that unmanned vehicle 101 can move within the environment untethered and/or wirelessly.

Network 105 can hence comprise any suitable combination of: wired networks, wireless networks, cell-phone networks, cellular network networks (including but not limited to 2G, 2.5G, 3G, 4G+, and the like), Bluetooth networks, NFC (near field communication) networks, WiFi networks, WiMax networks, packet based networks, the Internet, analog networks, the PSTN (public switched telephone network), WiFi access points, and the like, and/or a combination.

As depicted, in FIG. 1, unmanned vehicle 101 comprises a wheeled land vehicle and, in particular, a wheeled vehicle that can be used within a warehouse to one or more of move and/or carry inventory and/or items within the warehouse and/or perform tasks within the warehouse for example by interacting with features within the warehouse including, but not limited to, conveyors and the like.

Indeed, it should be emphasized that the shape and structure of unmanned vehicle 101 in FIGS. 1 and 2 are purely examples, and contemplate a device that can be used for autonomous and/or remote controlled wheeled movement. However, FIG. 1 contemplates a device that can be used for any suitable specialized functions, including, but not limited, to one or more of, warehouse applications, environmental applications, farming applications, and/or any application that can be implemented by a wheeled vehicle.

With reference to FIG. 1, an exterior of unmanned vehicle 101 is depicted with one or more sensors 119 mounted on a front portion of chassis 109, and one or more wheels of propulsion system 115 extending from a bottom of unmanned vehicle 101; however, the shape and configuration of unmanned vehicle 101 depicted in FIG. 1 is merely an example and other shapes and configurations are within the scope of present implementations. While internal components of unmanned vehicle 101 are not depicted in FIG. 1, they are nonetheless present, as depicted in FIG. 2.

Furthermore, FIG. 1 further depicts other external features of unmanned vehicle 101 according to non-limiting implementations. For example, as depicted, unmanned vehicle 101 can comprise indicator lights 150 (e.g. the three slits on each corner), a control panel 151, attachment points 152 (e.g. hooks), a mounting and/or load bearing surface 153 configured to support and/or carry a payload, and load cell positions 154 on each of four corners of surface 153 configured to sense the weight of a payload on surface 153. However, other features are within the scope of present implementations, including, but not limited to: force and/or torque sensors configured to sense a direction of shear of payloads; mounting points for sensors, computing systems, and other devices; drawers, handles, latches and the like for accessing an interior of unmanned vehicle 101; bumpers; battery bays and/or battery bay latches; and controls, including, but not limited to, a latching pushbutton configured to activate and deactivate unmanned vehicle 101, and a safety pushbutton configured to stop unmanned vehicle 101 in an emergency, and the like. Other types of features are within the scope of present implementations including, but not limited to, features associated with any specialized functions of unmanned vehicle 101; for example, when unmanned vehicle 101 comprises an aquatic vehicle, unmanned vehicle 101 can comprise features associated with aquatic operation of unmanned vehicle 101 and, when unmanned vehicle 101 comprises an aeronautic vehicle, unmanned vehicle 101 can comprise features associated with aeronautic operation of unmanned vehicle 101, etc.

With reference to FIG. 2, unmanned vehicle 101 further comprises a computer and/or communication bus, and the like, used by components of unmanned vehicle 101 for communication and/or control of unmanned vehicle 101. In particular, data and/or commands received at interface 124 are, in turn, received at processor 120 (that can be implemented as a plurality of processors, including but not limited to one or more central processors (CPUs); in particular processor 120 can comprise a hardware processor). Processor 120 is configured to communicate with a memory 122 comprising a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of unmanned vehicle 101 as described herein are typically maintained, persistently, in memory 122 and used by processor 120, which makes appropriate utilization of volatile storage during the execution of such programming instructions. Those skilled in the art will now recognize that memory 122 is an example of computer readable media that can store programming instructions executable on processor 120. Furthermore, memory 122 is also an example of a memory unit and/or memory module.

Memory 122 further stores an application 144 that, when processed by processor 120, enables processor 120 to: operate propulsion system 115 in a guided calibration mode by: receiving, using communication interface 124, one or more commands from external guided control system 103; moving, using propulsion system 115, chassis 109 according to the commands; collecting sensor data from one or more sensors 119 while implementing the commands; and, processing the sensor data using one or more uncertainty models to determine at least one degree of certainty on a calibration of one or more of the sensor data and a position of chassis 109; automatically switch operation of propulsion system 115 to an autonomous calibration mode when the degree of certainty is above a first threshold value associated with safe operation of propulsion system 115 in the autonomous calibration mode; thereafter, operate propulsion system 115 in the autonomous calibration mode by: automatically moving, using propulsion system 115, chassis 109; collecting the sensor data from one or more sensors 119 while automatically moving chassis 109 using propulsion system 115; and, further processing the sensor data using one or more uncertainty propagation models to determine at least one further degree of certainty on the calibration; and, automatically switch operation of propulsion system 115 to an operational mode when the degree of certainty is above a second threshold value greater than the first threshold value.

Furthermore, memory 122 storing application 144 is an example of a computer program product, comprising a non-transitory computer usable medium and/or non-transitory memory having a computer readable program code adapted to be executed to implement a method, for example a method stored in application 144.

As depicted, memory 122 also stores: a performance level threshold 145; a first threshold value 146 associated with safe operation of propulsion system 115 in an autonomous calibration mode; and second threshold value 147 greater than first threshold value 146, second threshold value 147 associated with operational performance levels of an operational mode. Threshold 145, and threshold values 146, 147 can be configured at memory 122 in a provisioning process, and/or at a factory and/or can be received from guided control system 103.

Processor 120 also connects to communication interface 124 (interchangeably referred to interchangeably as interface 124), which can be implemented as one or more radios and/or connectors and/or network adaptors, configured to wirelessly communicate one or more communication networks, including network 105, and external guided control system 103 via one or more links, including link 107-1. It will be appreciated that interface 124 is configured to correspond with network architecture that is used to implement at least link 107-1 to network 105, including but not limited to any suitable combination of wireless links, cellphone links, cellular network links (including but not limited to 2G, 2.5G, 3G, 4G+ such as UMTS (Universal Mobile Telecommunications System), GSM (Global System for Mobile Communications), CDMA (Code division multiple access), FDD (frequency division duplexing), LTE (Long Term Evolution), TDD (time division duplexing), TDD-LTE (TDD-Long Term Evolution), TD-SCDMA (Time Division Synchronous Code Division Multiple Access) and the like, wireless data, Bluetooth links, NFC (near field communication) links, WLAN (wireless local area network) links, WiFi links, WiMax links, packet based links, the Internet, analog networks, the PSTN (public switched telephone network), access points, and the like, and/or a combination.

Specifically, interface 124 comprises radio equipment (i.e. a radio transmitter and/or radio receiver) for receiving and transmitting signals and/or commands and/or task data via link 107-1.

Propulsion system 115 can comprise any suitable propulsion system configured to move chassis 109 and/or unmanned vehicle 101 within an environment. While propulsion system 115 is depicted as wheels in FIG. 1, propulsion system 115 can generally comprise a propulsion system corresponding to a vehicle type of unmanned vehicle 101. For example, while only wheels are depicted in FIG. 1, propulsion system 115 can comprise any suitable combination of motors, steering apparatus, actuators, wheels, treads, and the like that enables unmanned vehicle 101 to move within a land-based environment. For example, while only one wheel is depicted in FIG. 1, due to the perspective of FIG. 1, propulsion system 115 can comprise any number of wheels and further any number of motors and/or actuators for driving and/or steering and/or moving and/or turning and/or pivoting the wheels.

Furthermore, when unmanned vehicle 101 comprises an aquatic vehicle, propulsion system 115 can comprise one or more aquatic propellers, one or more aquatic jets, one or more pumps and the like. Similarly, when unmanned vehicle 101 comprises an aeronautic vehicle, propulsion system 115 can comprise one or more propellers, one or more aeronautic jets, and the like.

Indeed, chassis 109 can similarly correspond to a type of unmanned vehicle 101. For example, as depicted, chassis 109 comprises a shape and/or configuration suitable for wheeled movement, with a bottom of chassis 109 located a distance from an outer edge of the wheels (i.e. so that chassis 109 can clear a floor with which the wheels are interacting). Similarly, when unmanned vehicle 101 comprises an aquatic vehicle, chassis 109 can comprise pontoons, a keel, and the like. Furthermore, when unmanned vehicle 101 comprise an aeronautical vehicle, chassis 109 can comprises wings, stabilizers, and the like.

One or more sensors 119 can comprise one or more sensors configured to detect features within the environment within which chassis 109 and/or unmanned vehicle 101 is to move, including, but not limited to, one or more cameras, one or more LIDAR (Light Detection and Ranging) devices, one or more laser sensing devices, one or more radar devices, one or more accelerometers, one or more magnetometers, and the like. Furthermore, while only one sensor 119 is depicted in FIG. 1, located at a centre of a front of chassis 109, in other implementations, unmanned vehicle 101 can comprise two or more sensors 119 located anywhere on chassis 109, including, but not limited to, raised from chassis 109 using any suitable combination of mounting devices. Furthermore, one or more sensors 119 can be off-centre from chassis 109.

As described in further detail below, in particular, one or more sensors 119 are configured to sense and/or detect features, and in particular at least a given feature, of an environment within which unmanned vehicle 101 is to move.

As depicted, one or more sensors 119 comprises an optional GPS device 130, which is generally configured to communicate with an external Global Positioning System (not depicted) in order to determine a location of chassis 109 and/or unmanned vehicle 101. However, one or more sensors 119 can comprise any suitable device, and/or combination of devices, used to determine a location of chassis 109 and/or unmanned vehicle 101, which can be internal to chassis 109 and/or unmanned vehicle 101 and/or external to chassis 109 and/or unmanned vehicle 101 including, but not limited to a motion capture system. Furthermore, in other implementations, one or more sensors 119 can be used to determine a coordinate of chassis 109 and/or unmanned vehicle 101 within a global reference frame and/or a local reference frame. For example, at least one of one or more sensors 119 can be configured to observe coordinates of chassis 109 and/or unmanned vehicle 101 within a global reference frame, and/or a local reference frame, for example by sensing the environment and/or features therein and/or positional markers therein.

Regardless, processor 120 can generally be further configured to determine a position of chassis 109 and/or unmanned vehicle 101 and/or determine that chassis 109 and/or unmanned vehicle 101 is at a given coordinate in a global reference frame, by one more of: using one or more sensors 119, at least one of one or more sensors 119 configured to observe coordinates of chassis 109 and/or unmanned vehicle 101 within a global reference frame; using GPS (Global Positioning System) device 130; using a motion capture system; processing one or more geofences associated with the given coordinate; using simultaneous localization and mapping ("SLAM") techniques; using other sensor processing-based methods; and determining that chassis 109 and/or unmanned vehicle 101 is within a given distance from the given coordinate, as described in further detail below.

While also not depicted, unmanned vehicle 101 further comprises a power source, including, but not limited to a battery, a power pack and the like.

In any event, it should be understood that a wide variety of configurations for unmanned vehicle 101 are contemplated.

External guided control system 103 generally comprises a communication device that can transmit commands to unmanned vehicle 101, including, but not limited to commands for causing unmanned vehicle 101 to move, for example by controlling propulsion system 115. As such, guided control system 103 comprises (not depicted) a processor, a memory, and a communication interface, the processor configured to generate and transmit commands to unmanned vehicle 101. In some implementations, guided control system 103 comprises an observation device configured to observe unmanned vehicle 101 as unmanned vehicle moves within an environment; commands generated by the processor of guided control system 103 can be based on observations of unmanned vehicle 101 by the observation device. Such an observation device can include, but is not limited to, one or more cameras, one or more LIDAR devices, one or more laser sensing devices, one or more radar devices, and the like.

However, in other implementations, guided control system 103 can comprise one or more input devices, including a human-machine interface ("HMI") configured to receive input data, such that a human can be used as an observer with the HMI being used to receive input data there from, which can be translated into commands transmitted to unmanned vehicle 101 by the processor of guided control system 103. Regardless, from the perspective of unmanned vehicle 101, guided control system 103 interacting with a human is irrelevant and features of unmanned vehicle 101 generally occur automatically.

In any event, guided control system 103 can be configured to transmit commands and/or task data to unmanned vehicle 101. In addition, communication between external guided control system 103 and unmanned vehicle 101 can be in both directions (i.e. unmanned vehicle 101 can transmit data to external guided control system 103, including, but not limited to, a position of chassis 109 and/or unmanned vehicle 101 within an environment within which chassis 109 and/or unmanned vehicle is moving and/or a coordinate of chassis 109 and/or unmanned vehicle 101 within a reference frame, and/or when chassis 109 and/or unmanned vehicle 101 has arrived at a given coordinate and/or completed implementation of a given command and/or task data.

Furthermore, external guided control system 103 can be configured to communicate with other features in an environment within which chassis 109 and/or unmanned vehicle 101 is to move to control such features, for example in response to chassis 109 and/or unmanned vehicle 101 being located at a given coordinate.

Figure 3:
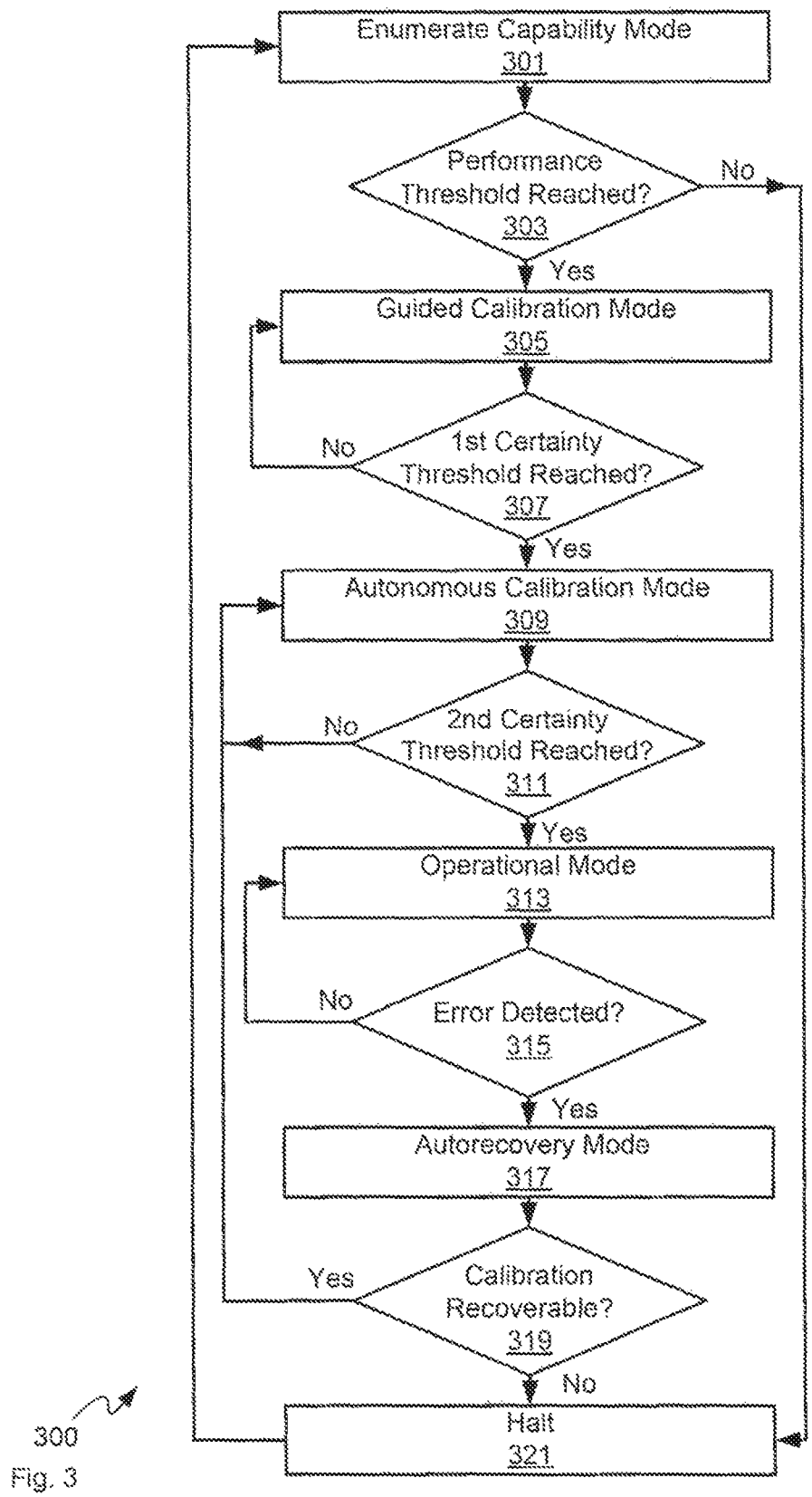
FIG. 3 depicts a method for implementing self-calibrating sensors and actuators for unmanned vehicles, according to non-limiting implementations.

Attention is now directed to FIG. 3, which depicts a flowchart of a method 300 for self-calibrating of sensors and actuators for unmanned vehicles, according to non-limiting implementations. In order to assist in the explanation of method 300, it will be assumed that method 300 is performed using system 200, and specifically by processor 120 of unmanned vehicle 101, for example when processor 120 processes application 144. Indeed, method 300 is one way in which unmanned vehicle 101 can be configured. Furthermore, the following discussion of method 300 will lead to a further understanding of unmanned vehicle 101, and system 200 and its various components. However, it is to be understood that unmanned vehicle 101, system 200 and/or method 300 can be varied, and need not work exactly as discussed herein in conjunction with each other, and that such variations are within the scope of present implementations.

Regardless, it is to be emphasized, that method 300 need not be performed in the exact sequence as shown, unless otherwise indicated; and likewise various blocks may be performed in parallel rather than in sequence; hence the elements of method 300 are referred to herein as "blocks" rather than "steps". It is also to be understood, however, that method 300 can be implemented on variations of unmanned vehicle 101 and/or system 200 as well.

At an optional block 301, processor 120 enumerates unmanned vehicle capabilities, by one or more of: receiving, using communication interface 124, a weight of unmanned vehicle 101; receiving, with the weight, an indication of accuracy of the weight; receiving, using communication interface, dimensions of unmanned vehicle 101; receiving, with the dimensions, a respective indication of accuracy of the dimensions of unmanned vehicle 101; autodetecting each of one or more sensors 119; receiving, using communication interface 124, a list of one or more sensors 119; and using a scanner to scan one or more graphical identifiers of one or more sensors 119. In general, block 301 is optional, and can occur, for example, when capabilities of unmanned vehicle 101 have not been previously enumerated and/or when such capabilities are not stored at memory 122.

At an optional block 303, implemented when block 301 is implemented, processor 120 determines whether an enumeration of the capabilities of unmanned vehicle 101 determined at block 301 supports and/or meets and/or has reached performance level threshold 145 stored at memory 122. In a non-limiting example, example, when performance level 145 threshold specifies that unmanned vehicle 101 be able to safely navigate at a given speed without hitting obstacles, at block 303, processor 120 can check that there are one or more sensors 119 that are configured to detect objects and/or features. When the enumeration does not support performance level threshold 145 (i.e. a "NO" decision at block 303), processor 120 continues to enumerate the unmanned vehicle capabilities at block 301, and optionally halts unmanned vehicle 101, if unmanned vehicle 101 is moving, at block 321. In other words, at least blocks 301, 303 form a feedback loop with block 303 being implemented either periodically and/or in parallel with block 301.

However, processor 120 automatically switches to the guided calibration mode, at block 305, when an enumeration of the unmanned vehicle capabilities supports performance level threshold 145 stored at memory 122 (i.e. a "YES" decision occurs at block 303).

Hence, at block 305, processor 120 operates propulsion system 115 in the guided calibration mode by: receiving, using communication interface 124, one or more commands from external guided control system 103; moving, using propulsion system 115, chassis 109 according to the commands; collecting sensor data from one or more sensors 119 while implementing the commands; and, processing the sensor data using one or more uncertainty models to determine at least one degree of certainty on a calibration of one or more of the sensor data and a position of chassis 109.

At block 307, processor 120 determines whether the degree of certainty being determined at block 305 is above first threshold value 146 associated with safe operation of propulsion system 115 in an autonomous calibration mode. For example, first threshold value 146 can specify one or more areas, with respect to unmanned vehicle 101, which should be monitored and/or observed by one or more sensors 119 to ensure safe operation of propulsion system 115 (e.g. an area in front of unmanned vehicle 101 and/or one or more areas adjacent given respective sides of unmanned vehicle 101, including, but not limited to, a given distance in front of unmanned vehicle 101; in other words, a specified "area" can include a given distance from a given respective side). In this example, at block 307, processor 120 can check to ensure that the degree of certainty of the position of sensors 119 established at block 305, combined with the capabilities of one or more sensors 119, matches one or more areas specified by first threshold value 146.

When the degree of certainty being determined at block 305 does not meet and/or is not above first threshold value 146 (i.e. a "NO" decision at block 307), processor 120 continues to operate unmanned vehicle 101 in the guided calibration mode at block 305 (while not depicted, when first threshold value 146 is not reached within a given time period, and/or after a given amount of sensor data is collected, at least blocks 301, 303 can be implemented again, with block 321 optionally implemented; in some of these implementations, performance level threshold 145 can be updated by processor 120 receiving updated performance level data using interface 124, for example from guided control system 103). In other words, at least blocks 305, 307 form a feedback loop with block 307 being implemented either periodically and/or in parallel with block 305.

However, processor 120 automatically switches operation of propulsion system 115 to an autonomous calibration mode, at block 309, when the degree of certainty is above first threshold value 146 associated with safe operation of propulsion system 115 in the autonomous calibration mode (i.e. a "YES" decision occurs at block 307).

Thereafter, at block 309, processor 120 operates propulsion system 115 in the autonomous calibration mode by: automatically moving, using propulsion system 115, chassis 109; collecting the sensor data from one or more sensors 119 while automatically moving chassis 109 using propulsion system 115; and, further processing the sensor data using one or more uncertainty propagation models to determine at least one further degree of certainty on the calibration.

At block 311, processor 120 determines whether the degree of certainty is above second threshold value 147 greater than first threshold value 146 (i.e. whether the degree of certainty has become more precise). For example, second threshold value 147 can specify values corresponding to a degree of certainty required to dock unmanned vehicle 101 within centimeters.

When the degree of certainty being determined at block 309 does not meet and/or is not above second threshold value 147 (i.e. a "NO" decision at block 311), processor 120 continues to operate unmanned vehicle 101 in the autonomous calibration mode at block 309 (while not depicted, when second threshold value 147 is not reached within a given time period, and/or after a given amount of sensor data is collected, at least blocks 301, 303 can be implemented again, with block 321 optionally implemented; in some of these implementations, performance level threshold 145 can be updated by processor 120 receiving updated performance level data using interface 124, for example from guided control system 103). In other words, at least blocks 309, 311 form a feedback loop with block 311 being implemented either periodically and/or in parallel with block 305.

However, processor 120 automatically switches operation of propulsion system 115 to an operational mode, at block 313, when the degree of certainty is above second threshold value 147 greater than first threshold value 146 (i.e. a "YES" decision occurs at block 311).

In the operational mode, unmanned vehicle 101 can navigate and/or move and/or implement tasks in the environment on the basis of the calibration performed at least at blocks 307, 309.

In some implementations, in the operational mode, unmanned vehicle 101 can process and/or implement task data received, for example, from guided control system 103 and/or an external server (not depicted) configured to transmit task data to unmanned vehicle 101 so that tasks are carried out within the environment that unmanned vehicle 101 is moving; such as server can be configured to communicate wirelessly through network 105, and be further configured to control and/or coordinate features within the environment to assist unmanned vehicle 101 in carrying out the tasks. For example, when unmanned vehicle 101 is configured with functionality associated with warehouse tasks, the server can control unmanned vehicle 101 in the operational mode to interact with warehouse features to load and/or unload onto/from conveyors, and/or move items around a warehouse, unmanned vehicle 101 navigating around the warehouse on the basis of the calibration performed at least at blocks 307, 309.

During the operational mode, at block 315, processor 120 can monitor one or more sensors 119 for errors, that can occur, for example, when one or more sensors are damaged and/or fail and/or are repositioned with respect to chassis 109, and/or when an accident occurs (e.g. one or more sensors 119 fail to detect a feature in the environment and a crash, and the like occurs), though other error types are within the scope of present implementations. Mathematically, an error can be based on one or more of: a boundary of an estimated parameter; a rate of change of the estimated parameter; a variance in signals from one or more sensors 119; and/or any other anomalies that can be detected by combining data from a plurality of sensors 119, and/or with historical data, and/or with calibration data, and the like.

When no errors are detected (i.e. a "NO" decision at block 315), processor 120 continues to implement the operational mode at block 313.

However, processor 120 automatically switches to one or more of an error mode and an autorecovery mode, at block 317, when an error is detected in the operational mode (i.e. a "YES" decision at block 315), by: stopping and/or halting (at block 321), using propulsion system 115, movement of chassis 109; and, automatically switching to one or more of the enumerate capability mode, at block 301 (as depicted) and the guided calibration mode, at block 305 (in other words, in some implementations, blocks 301, 303 are skipped when an error is detected). In some of these implementations, block 319 can optionally be implemented to determine whether the calibration of at least blocks 305, 309 is recoverable. For example, at block 319, processor 120 can determine whether the at least one degree of certainty on the calibration has fallen below second threshold value 147, but remains greater than first threshold value 146 (i.e. the at least one degree of certainty has fallen between first threshold value 146 and second threshold value 147); when such a condition is met (i.e. a "YES" decision at block 319), processor 120 automatically switches back to the autonomous calibration mode 309. Otherwise, when processor 120 determines that the at least one degree of uncertainty has fallen below first threshold value 146 (i.e. a "YES" decision at block 319), processor 120 can halt unmanned vehicle 101 at block 321 and return to implementing block 301 (as depicted), and/or return to implementing block 305.

In particular, at blocks 305 to 311, processor 120 can be further configured to process the sensor data using one or more uncertainty propagation models to determine the at least one degree of certainty and the at least one further degree of certainty, to determine one or more of: a respective calibration of a relationship between uncertainty on sensor measurements with respect to a position of chassis 109 (i.e. using GPS coordinates and/or a location within a global reference frame); a respective location of each of one or more sensors 119 with respect to chassis 109; a respective orientation of each of one or more sensors 119 with respect to chassis 109; and, one or more of respective shapes and respective locations of sensed features. Uncertainty propagation models can include but not be limited to applying linear and nonlinear sensor models to error estimates, Kalman filters as implemented for parameter estimation, generalized least squares estimators, particle filters, and graph-based optimization approaches.

Hence, first threshold value 146 and second threshold value 147 each comprise a respective constraint on one or more of: a control algorithm, a mapping algorithm, a localization algorithm, at least one performance capability, and at least one current probability distribution.

In other words, each of first threshold value 146 and second threshold value 147 can specify an increasing degree of precision on the sensor data and/or a position of chassis 109, with the guided calibration mode being used to safely operate unmanned vehicle 101 to collect sensor data until the sensor data reaches a degree of certainty (represented by first threshold value 146) where unmanned vehicle 101 can safely operate without external guidance. Such safe operation can include, but is not limited to, unmanned vehicle 101 operating without external guidance with a degree of certainty that unmanned vehicle 101 will not crash into features within the environment when operating in the autonomous mode. Such a degree of certainty can be defined as unmanned vehicle 101 being able to navigate within the environment to within about +/−10 cm accuracy (and the like), so that crashes do not occur.

An automatic switch from the autonomous calibration mode to the operational mode occurs when the sensor data reaches a degree of certainty (represented by second threshold value 146) where unmanned vehicle 101 can operate according to defined performance levels, which can include docking at a feature in the environment (such as a conveyor and the like). For example, autonomous calibration mode can be implemented until it is determined that unmanned vehicle 101 can navigate within a given precisions, such as about +11 mm (and the like), so that docking can automatically occur without an accident.

Hence, in these example implementations, first threshold value 146 can comprise about 10 cm, and second threshold value 147 can comprise about 1 mm, though other types of degrees of certainties, and other types of threshold values are within the scope of present implementations.

Indeed, in practical implementations, such degrees of certainties and threshold values can be expressed with respect to constraints on one or more of: a control algorithm, a mapping algorithm, a localization algorithm, at least one performance capability, and at least one current probability distribution, rather than actual physical values, though such mathematical expressions of degrees of certainties and threshold values can be representative of physical values.

Furthermore, such degrees of certainty can be determined heuristically prior to implementation of method 300, and first threshold value 146 and second threshold value 147 provisioned at memory 122 in a provisioning process and/or at a factory.

Furthermore, each of threshold values 146, 147 can comprise one or more values, for example corresponding to respective degrees of certainty for sensor types and/or positions and/or locations and the like.

A similar provisioning process can occur for performance level threshold 145 stored at memory 122, however performance level threshold 145 can be expressed with regard to one or more of: a minimum number of sensors, sensor types, and the like. For example, performance level threshold 145 can specify that unmanned vehicle 101 comprise at least one position sensing sensor and one feature sensing sensor, and the like. This example illustrates that performance level threshold 145 can comprise one or more values.

Method 300 will now be described with respect to FIGS. 4 to 6, each of which are similar to each other, with like elements having like numbers.

Figure 4:
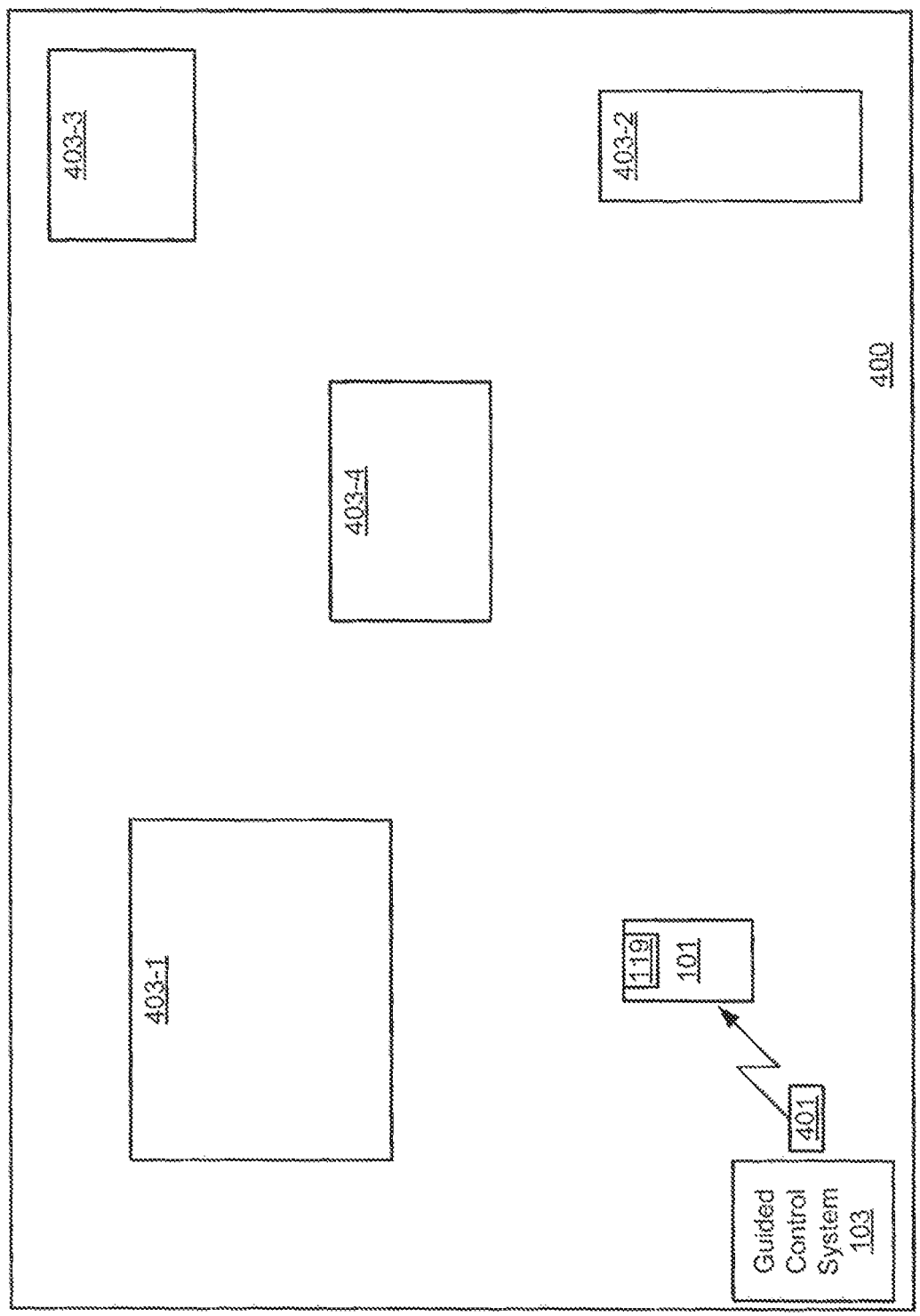
FIG. 4 depicts an initiation of the method of FIG. 3 at the unmanned vehicle within an environment, according to non-limiting implementations.

Attention is next directed to FIG. 4, which depicts an environment 400 in which unmanned vehicle 101 is being deployed. Unmanned vehicle 101 is depicted schematically in FIG. 4 as a rectangle, though it is appreciated that unmanned vehicle 101 is moving within environment 400 using propulsion system 115 and/or wheels, not depicted in FIG. 4 but nonetheless assumed to be present).

In a non-limiting example environment 400 can comprise a warehouse having walls (i.e. as indicated by a rectangle in FIG. 4 defining external limits of the warehouse) and features 403-1, 403-2, 403-3, 403-4 therein, which can include, but are not limited to shelving, workstations, storage areas, conveyors and the like. Features 403-1, 403-2, 403-3, 403-4 will be interchangeably referred to hereafter, collectively, as features 403 and generically as a feature 403. Furthermore, while four features 403 are depicted, environment 400 can comprise any number of features. Furthermore, external guided control system 103 and/or an external server, and one or more features 403 can be configured to communicate with each other, similar to communication described above with respect to unmanned vehicle 101 and external guided control system 103; hence, while not depicted, each of one or more features 403 can comprise at least a communication interface, similar to interface 124, configured to communicate with external guided control system 103 and/or a server via network 105 and/or another communication network. Each of one or more features 403 can further comprise a processor configured to implement commands received from external guided control system 103 and/or a server, for example to control a conveyor device to off load items onto unmanned vehicle 101 and/or to load items from unmanned vehicle 101 onto the conveyor device.

Also depicted in FIG. 4 is a representation of guided control system 103, and it is assumed that guided control system 103 can communicate with unmanned vehicle 101 via network 105 and wireless link 107-1 (though neither network 105 or link 107-1 is depicted in FIG. 4), for example to transmit commands thereto. It is further assumed in FIG. 4 that, when guided control system 103 comprises an observation device, such as a camera, such an observation device is located and/or oriented in environment 400 to observe unmanned vehicle 101 as unmanned vehicle 101 moves through environment 400. In particular, the observation device can be positioned above features 403 so that features 403 do not obscure observation device.

In any event, it is assumed that unmanned vehicle 101 is deployed for a first time in environment 400 and hence method 300 is to be implemented at unmanned vehicle 101 in order to calibrate unmanned vehicle 101.

Method 300 can hence be initialized at unmanned vehicle 101, and unmanned device 101 and guided control system 103 can initiate communication there between. As depicted, guided control system 103 can transmit data 401 to unmanned vehicle 101 when communications are being initiated, as an aspect of block 301 and/or prior to block 301 being implemented, data 401 comprising one or more of: threshold 145, threshold values 146, 147, a weight of unmanned vehicle 101, an indication of accuracy of the weight, dimensions of unmanned vehicle 101, a respective indication of accuracy of the dimensions of unmanned vehicle 101 and the like. In some implementations, data 401 can include, but is not limited to, an overall envelope of unmanned vehicle 101, with an optional indication of accuracy, a range of weight of unmanned vehicle 101 with optional indications of accuracy, and optional payload weights (that can be included when payload weights within environment 400 are known).

Unmanned vehicle 101 can continue implementing block 301 and/or begin implementing block 301 once data 401 is received; in some implementations, unmanned vehicle 101 can request data 401 and/or guided control system 103 can transmit data 401 as part of communication initiation between unmanned vehicle 101 and guided control system 103.

In any event, during block 301, unmanned vehicle 101 enumerates unmanned vehicle capabilities, for example by querying each of one or more sensors 119 and/or propulsion system 115. In essence, at block 301, unmanned vehicle 101 is determining what its own capabilities are. Such enumeration can also include, but is not limited to: receiving at least a portion of sensor and/or actuator capabilities in data 401 and/or via a text file and/or via control panel 151 (and/or another input device): autodetection and sensor and/or actuator capabilities; an optical scan of optical identifiers (e.g. a barcode) of sensor and/or actuator capabilities (presuming the optical identifiers are accessible to unmanned vehicle 101 in environment 400 and/or system 200); and the like. Enumeration of block 301 can further include one or more of: automatically loading sensor and/or actuator drivers; installing such drivers by downloading them via network 105 and/or the Internet, and the like; receiving and/or establishing intrinsic parameters, such as noise models, field of view of one or more sensors 119, range of one or more sensors 119, and other informative parameters such as category, manufacturer and/or serial number of one or more sensors 119 and/or actuators of propulsion system 115.

In any event, once performance threshold 145 is reached at block 303, unmanned vehicle 101 transitions to the guided calibration mode at block 305.

Determination of whether and/or when performance threshold 145 is reached can include, but is not limited to, comparing data determined at block 301 to a set of system capabilities stored in performance threshold 145 that can be expressed with regards to a minimum set of capabilities for obstacle detection, GPS navigation, and the like and/or as a minimum pre-determined set of sensor and/or actuator capabilities and/or and algorithms. Performance threshold 145 can also comprise a mapping within a database from capabilities to sensor/actuator requirements and/or algorithm requirements. Performance threshold 145 can also include, but is not limited to a set of pre-determined system performance level of unmanned vehicle 101, including, but not limited to (navigation accuracy, control accuracy, and the like, and further defining a minimum set of sensor and/or actuator types that has been predetermined as desirable at unmanned vehicle 101. Such system performance levels can also be mapped within a database from capabilities to sensor/actuator requirements and/or algorithm requirements. In some implementations, feedback on limitations on the configuration of one or more sensors 119 (in addition to the number and types of sensors) can be provided, for example, using a calibration algorithm (e.g. within application 144) that can specify that and/or determine whether two or more of sensors 119 produce overlapping fields of view so that a calibration pattern and/or target can be visible to the at least two of sensors 119; and/or performance threshold 145 can specify minimum and/or maximum distances between at least a portion of one or more sensors 119.

It is further appreciated that method 300 can transition to block 301 from others of blocks 303 to 321 when a new sensor is added to unmanned vehicle 101 during operation and/or the server controlling environment 400, and the like, transmits task data indicating that unmanned vehicle 101 is to execute a new mission type, that has not been previously executed and may be outside a calibration that has previously occurred.

In some specific non-limiting implementations, block 303 can include transmitting an indication to guided control system 103 (i.e. an indication that performance threshold 145 has been reached) and waiting for confirmation to implement the transition to the guided calibration mode.

Figure 5:
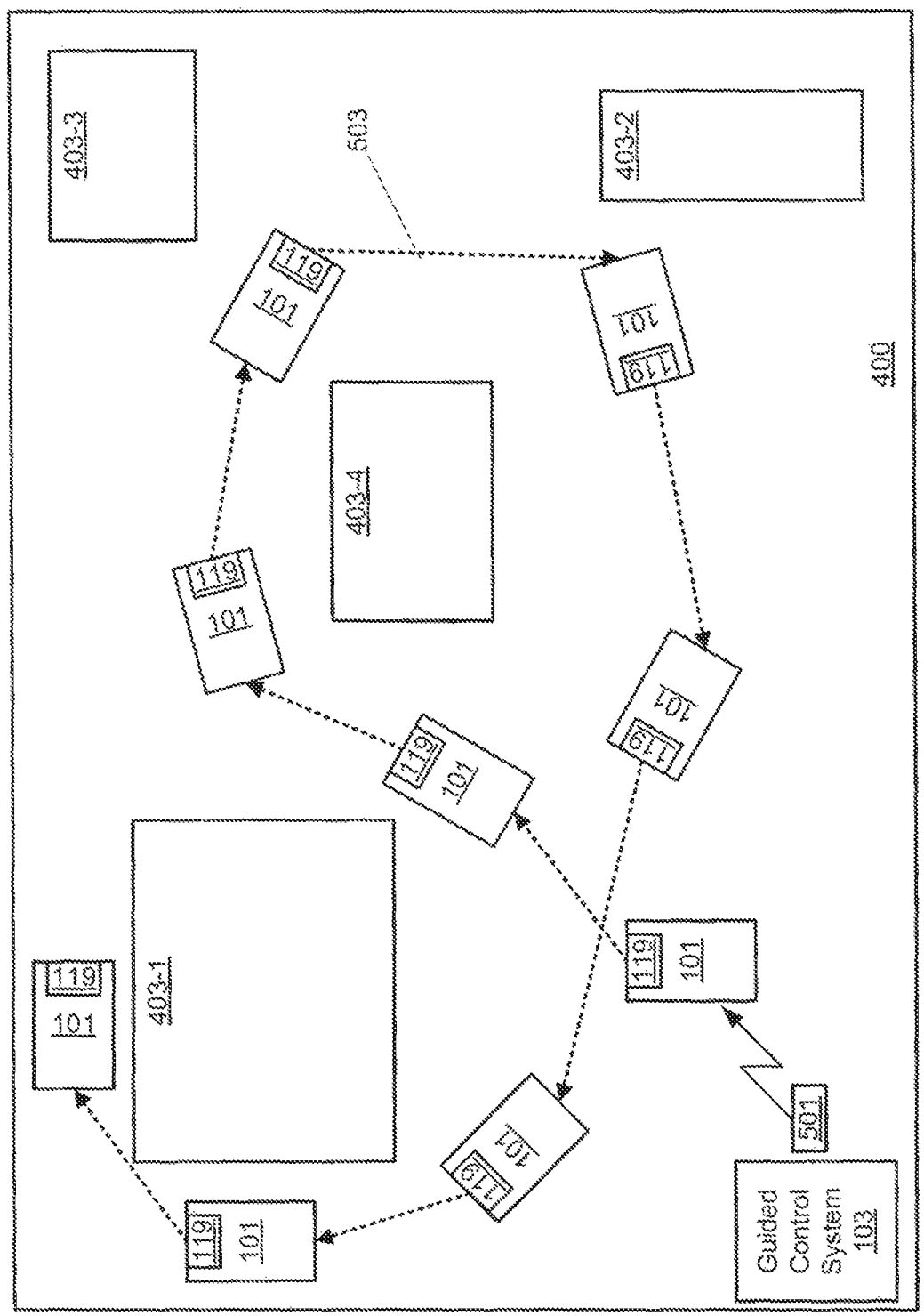
FIG. 5 depicts the unmanned vehicle operating in a guided calibration mode within the environment of FIG. 4, according to non-limiting implementations.

Attention is next directed to FIG. 5, in which unmanned vehicle 101 has entered guided calibration mode at block 305, and guided control system 103 is transmitting one or more commands 501 to unmanned vehicle 101. While not depicted, unmanned vehicle 101 can initiate block 305 by transmitting an indication of entering the guided calibration mode to guided control system 103, and guided control system 103 can respond by transmitting one or more commands 501 to unmanned vehicle 101. During the guided calibration mode, unmanned vehicle 101 receives commands 501 and moves according to one or more commands 501 using propulsion system 115; for example, as depicted unmanned vehicle 101 can move around features 403 in path 503 (indicated by stippled arrows in FIG. 5); path 503 can be determined using guided control system 103, for example using an observation device to observe positions of unmanned vehicle 101 within environment 400. In general, path 503 can include movement of unmanned vehicle 101 around features 403.

Furthermore, one or more sensors 119 collect sensor data while moving in the guided calibration mode, for example by detecting features and/or a position of unmanned vehicle 101 (and/or chassis 109), and processor 120 processes the sensor data using one or more uncertainty models to determine at least one degree of certainty on a calibration of one or more of the sensor data and a position of unmanned vehicle 101 and/or chassis 109.

In general, environment 400 can comprise the environment within which unmanned vehicle 101 is to operate in the operational mode, however, environment 400 can alternatively comprise a generally representative environment (i.e. not the environment within which unmanned vehicle 101 is to operate in the operational mode, but an environment similar thereto). Furthermore, environment 400 is configured to provide information and/or features that is suitable for calibration of unmanned vehicle 101 and/or one or more sensors 119; for example, one or more sensors 119 comprises a LIDAR device, an environment is selected that is suitable for LIDAR calibration (e.g. unmanned vehicle 101 should not be moved down a narrow, long hallway for LIDAR calibration) and/or a camera should not be calibrated in a featureless environment.

Furthermore, path 503, and/or movement of unmanned vehicle 101, can be selected so that a range of configuration space of one or more sensors 119 and/or actuator inputs of propulsion system 115 are explored, as well as a range of terrain angles. As such, each of one or more sensors 119 acquires many measurements of static features 403 of environment 400 as unmanned vehicle 101 moved there through. Path 503, and/or movement of unmanned vehicle 101, can further be selected to maximize observability of sensor parameters (i.e. movement of unmanned vehicle 101 is not limited to pure rotation and translation motion to calibrate extrinsic parameters between two sensors).

The guided calibration mode can further include, but is not limited to: taking into account the types of available sensing technologies to aid the calibration of kinematics (for example, for SCLAM (simultaneous calibration, localization and mapping), optimization problems jointly optimizes extrinsic parameter and kinematic parameters of differential drive vehicles using wheel odometry and laser odometry as sources); calibration of features 403 within environment 400 (i.e. one or more of features 403 are mapped and/or calibrated); use of extrinsics and/or kinematic models; unmanned vehicle 101 being configured with its own kinematics (e.g. in a provisioning process, and the like); multi-stage learning (e.g. learning of kinematics first, then dynamics); use of lighting invariance and/or normalization; and the like.

During the guided calibration mode, as described above, unmanned vehicle 101 compares a degree of uncertainty on a calibration of one or more of the sensor data and a position of unmanned vehicle 101 and/or chassis 109. Hence, during the guided calibration mode processor 120 is performing the calibration, generating the degree of uncertainty on the calibration, and comparing the degree of uncertainty to first threshold value 145.

Indeed, during the guided calibration mode the uncertainty in the position/orientation of sensors and kinematics of unmanned vehicle 101 is reduced as sensor data is collected and processed. Furthermore, by calibrating kinematics of unmanned vehicle 101, an area that unmanned vehicle 101 covers is established as path 503 is traversed. Indeed, by determining and calibrating sensor parameters, such as frequency, field of view, range, and the like, areas and/or portions of unmanned vehicle 101 that are to be covered by one or more sensors 119, for example with respect to chassis 109, can be established with a high degree of probability. Similarly, given known weight ranges, accelerations, frequency and/or range and/or rough locations of one or more sensors 119 (at least a portion of which can be received with data 401), and increasing certainty in vehicle sensor locations, safety stop parameters of unmanned vehicle 101 can be tuned, and a subset of the admissible velocities that are able to be used autonomously can be established. In some implementations, "admissible" velocities can include predefined velocities.

Indeed, once a suitable subset is established, which can be determined by comparing by the degree of certainty to first threshold value 146 associated with safe operation of propulsion system 115 in the autonomous calibration mode, it can be determined that unmanned vehicle can navigate safely, at least in a rough fashion, for example when the degree of certainty is above first threshold value 146 at block 307. Transition to the autonomous calibration mode then occurs automatically.

In some specific non-limiting implementations, block 307 can include transmitting an indication that first threshold value 146 has been reached to guided control system 103, and waiting for confirmation to implement the transition to the autonomous calibration mode.

Attention is next directed to FIG. 6, which depicts unmanned vehicle 101 in the autonomous calibration mode, in which unmanned vehicle 101 moves according to a path 603, path 603 determined by unmanned vehicle 101. Path 603 can be determined by unmanned vehicle 101 as unmanned vehicle 101 is moving through environment 400 in the autonomous calibration mode, in a manner that enables the calibration to be further refined. For example, unmanned vehicle 101 can pass closer to features 403 in the autonomous calibration mode than in the guides calibration mode, and/or unmanned vehicle 101 can implement movement that corresponds to tasks that could be later carried out during the operational mode including, but not limited to, moving with decreasing acceleration directly towards a feature 403, for example in a mock docking procedure, as depicted in FIG. 6.

In particular, processor 120 can process a current probability distributions on sensor locations and/or kinematic parameters, and responsively generate path 603 (i.e. motions of unmanned vehicle 101), which will assist at narrowing in on those distributions; for example, under-excited degrees of freedom (i.e. degrees of freedom of motion of unmanned vehicle 101, and/or of one or more sensors 119, which were not well explored in the guided calibration mode) can be excited in the autonomous calibration mode. As such, as unmanned vehicle 101 moves in the autonomous calibration mode, sensor data is again collected and the calibration is further refined until second threshold value 147 is reached at block 311, and unmanned vehicle 101 transitions to the operation mode at block 313.

In the operational mode, unmanned vehicle 101 can receive task data from the aforementioned survey to carry out tasks within environment 400 and/or within an associated environment; however, processor 120 can be further configured to, in the operational mode, continue monitoring sensor data and continue calibration as described above.

Furthermore, in the operational mode, processor 120 can continue to monitor the same operational situations as occurred in the autonomous calibration mode, and re-implement at least block 309 when drift and/or an error occurs at block 315: i.e. the autorecovery mode is entered and the calibration is determined to be recoverable. When the calibration is not recoverable, at least block 301 can be re-implemented once the autorecovery mode is entered at block 317, and it is determined whether the calibration is not recoverable, and optionally block 321 when unmanned vehicle 101 is moving when the error is detected.

Processor 120 can determine that an error has occurred when boundaries and/or rater of change on various parameters being estimated are violated. Such boundaries can be predetermined and stored in one or more of first threshold value 146, second threshold value 147 and/or other data stored at memory 122; such boundaries can be system wide and/or defined for each of one or more sensors 119. In some implementations, once an error has occurred, processor 120 can optionally transmit an indication of such, for example to the server and/or guided control system 101 as well as halting unmanned vehicle 101 (e.g. by controlling propulsion system 115), and wait for confirmation to commence auto-recovery.

In some implementations, memory 122 can further store an accuracy with which a miscalibration can be determined, also determine time taken to make a determination of miscalibration. For example, there can be a tradeoff between a degree of miscalibration that can be detected and the number of sensor readings used to determine the errors in calibration. For instance being able to reliably detect errors in rotation on the order of 1/10th of a degree could take several seconds depending on the algorithms being used that in turn could affect real-time/time-critical operations.

In some implementations where one or more sensors 119 includes a camera, memory 122 can store (e.g. after the autonomous calibration mode) a calibration of camera change over time vs. warning and/or error signals, which can be based on boundaries and/or rate of change of images acquired by the camera. Using such a calibration, errors in the camera can be detected.

Indeed, processor 120 can maintain an extrinsic estimation of calibration running in the background during the operational mode, and determine that an error can have occurred when a current estimate deviates from a target value, based on threshold values for example.

Persons skilled in the art will appreciate that there are yet more alternative implementations and modifications possible. For example, in some implementations, unmanned vehicle 101 and/or environment 400 can respectively include onboard and/or offboard calibration targets, including, but not limited to colour palettes for camera calibration. Furthermore, an evaluation of the calibration evaluation can include comparisons to a manufacturer's calibrations and/or intrinsic values associated with one or more sensors 119, for example to determine whether the calibration is within manufacture specifications. Indeed, one or more of first threshold value 146 and second threshold value 147 can include values provided by a manufacture.

Calibration can also include, but is not limited to one or more of: calibrating kinematics of a camera mount; calibrating kinematics and/or dynamics of an active suspension of unmanned vehicle 101 and/or propulsion system 115; calibration of a GPS device to determine, for example, directions in which poor data is received so that further calibration can occur in those directions; calibration of a relationship between uncertainty of sensor measurements with respect to an (X, Y) position in environment 400 and/or in a map of environment 400 and/or in a global reference frame and/or in a local reference, which can be used for path planning; feedback to guided control system 103; feedback on where sensor placements may interact poorly with environment 400 (i.e. a degree of certainty on a calibration of a given sensor fails to reach at least first threshold value 146); use of distortion models for cameras, and the like; syncing timing of one or more sensors 119; autodetecting occlusion of a camera, and/or another sensor type, by causing the camera to point at the ground; use of ground points detection and removal via training; use of mixed integer-linear programming ("MILP") for the calibration of motion models that contain, in part, discrete parameters; calibrating structured light source emitters; and generation of graphical models to assist in sensor/actuator positioning (though such modeling can occur prior to implementing method 300).

In any event, provided herein is an unmanned vehicle that is configured to automatically self-calibrate sensors and/or actuators thereof by operating in a guided calibration mode and automatically transitioning to an autonomous calibration mode, once a degree of certainty on the calibration indicates that the unmanned vehicle can safely operate without external guidance. The unmanned vehicle continues to operate in the autonomous calibration mode until a given performance target level on the calibration is reached, and the unmanned vehicle automatically transitions to an operational mode. In other words, each transition occurs as the degree of certainty on the calibration is refined in each of the calibration modes, and thresholds are reached. The unmanned vehicle continues to monitor the calibration and can automatically transition back to one of the previous calibration modes, and/or an enumeration mode when drift occurs and/or an error is detected.

As such, the unmanned vehicle can be deployed at a new site without the need to send a skilled technician to calibrate the unmanned vehicle, as the calibration of the unmanned vehicle is automatic: even with the guided calibration mode, the determination of when to transition to the autonomous calibration mode occurs automatically.

Those skilled in the art will appreciate that in some implementations, the functionality of unmanned vehicles 101 and external guided control system 103 can be implemented using pre-programmed hardware or firmware elements (e.g., application specific integrated circuits (ASICs), electrically erasable programmable read-only memories (EEPROMs), etc.), or other related components. In other implementations, the functionality of unmanned vehicle 101 and external guided control system 103 can be achieved using a computing apparatus that has access to a code memory (not shown) that stores computer-readable program code for operation of the computing apparatus. The computer-readable program code could be stored on a computer readable storage medium that is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative implementations and modifications possible, and that the above examples are only illustrations of one or more implementations. The scope, therefore, is to be limited by the claims appended here.

What is claimed is:

1. An unmanned vehicle comprising:
   a chassis;
   a processor for controlling a propulsion system of the unmanned vehicle and receiving sensor data from one or more sensors of the unmanned vehicle, the processor is configured to:
   prior to entering an autonomous calibration mode, enumerate unmanned vehicle capabilities, by one or more of: receiving a weight of the unmanned vehicle; receiving one or more dimensions of the unmanned vehicle; autodetecting each of the one or more sensors; receiving a list of the one or more sensors; and using a scanner to scan one or more graphical identifiers of the one or more sensors;
   operate the propulsion system in the autonomous calibration mode by:

automatically controlling the propulsion system to move the chassis;
collecting the sensor data from the one or more sensors;
selecting one or more uncertainty propagation models from a plurality of uncertainty propagation models based on at least one of i.) one or more unmanned vehicle capabilities and ii.) the sensor data; and
processing the sensor data using the one or more uncertainty propagation models to determine at least one degree of certainty on a calibration of one or more of the sensor data and a position of the chassis;
determine that the degree of certainty is above a threshold value; and
subsequently switch operation of the propulsion system to an operational mode based on the determination that the degree of certainty is above the threshold value.

2. The unmanned vehicle of claim 1, wherein selecting the one or more uncertainty propagation models comprises selecting one or more kinematic models, dynamic models, and/or extrinsic models.

3. The unmanned vehicle of claim 1, wherein the processor is further configured to determine that the enumerated unmanned vehicle capabilities support a performance level threshold, and subsequently enable the autonomous calibration mode based on the determination that the one or more enumerated unmanned vehicle capabilities satisfies the performance level threshold.

4. The unmanned vehicle of claim 1, wherein the processor is further configured to process the sensor data using one or more uncertainty propagation models to determine the degree of certainty of one or more of: a respective calibration of a relationship between uncertainty on sensor measurements with respect to the position of the chassis; a respective location of each of the one or more sensors with respect to the chassis; a respective orientation of each of the one or more sensors with respect to the chassis; and, one or more of respective shapes and respective location of sensed features.

5. The unmanned vehicle of claim 1, wherein the one or more sensors comprise one or more of: cameras, LIDAR (Light Detection and Ranging) devices, laser sensing devices, radar devices, accelerometers, and magnetometers.

6. The unmanned vehicle of claim 1, wherein the threshold value comprises a respective constraint on one or more of: a control algorithm, a mapping algorithm, a localization algorithm, at least one performance capability, and at least one current probability distribution.

7. An unmanned vehicle comprising:
a chassis;
a processor for controlling a propulsion system of the unmanned vehicle and receiving sensor data from one or more sensors of the unmanned vehicle, the processor is configured told:
enumerate one or more unmanned vehicle capabilities by querying one or more of the propulsion system and the one or more sensors of the unmanned vehicle;
operate the propulsion system in an autonomous calibration mode by:
automatically controlling the propulsion system to move the chassis;
collecting the sensor data from the one or more sensors;
selecting one or more uncertainty propagation models from a plurality of uncertainty propagation models based on at least one of i.) one or more unmanned vehicle capabilities and ii.) the sensor data; and
processing the sensor data using the one or more uncertainty propagation models to determine at least one degree of certainty on a calibration of one or more of the sensor data and a position of the chassis;
determine that the degree of certainty is above a threshold value; and
subsequently switch operation of the propulsion system to an operational mode based on the determination that the degree of certainty is above the threshold value.

8. The unmanned vehicle of claim 7, wherein the enumerating the one or more unmanned vehicle capabilities comprises one or more of: receiving sensor capability data; and autodetecting sensor capability data.

9. The unmanned vehicle of claim 7, wherein the processor is further configured to determine that the enumerated unmanned vehicle capabilities support a performance level threshold, and subsequently enable the autonomous calibration mode based on the determination that the one or more enumerated unmanned vehicle capabilities satisfies the performance level threshold.

10. An unmanned vehicle comprising:
a chassis;
a communication interface; and
a processor for controlling a propulsion system of the unmanned vehicle and receiving sensor data from one or more sensors of the unmanned vehicle, the processor is configured to:
prior to entering an guided calibration mode, enumerate unmanned vehicle capabilities, by one or more of: receiving a weight of the unmanned vehicle; receiving one or more dimensions of the unmanned vehicle; autodetecting each of the one or more sensors; receiving a list of the one or more sensors; and using a scanner to scan one or more graphical identifiers of the one or more sensors;
in the guided calibration mode, while controlling the propulsion system according to commands received via the communications interface from an external guided control system, select one or more uncertainty propagation models from a plurality of uncertainty propagation models based on at least one of i.) one or more unmanned vehicle capabilities and ii.) the sensor data and, process the sensor data using the one or more uncertainty propagation models to determine at least one degree of certainty on a calibration of one or more of the sensor data and a position of the chassis;
determine that the degree of certainty is above a threshold value associated with a safe operation of the propulsion system in an autonomous calibration mode; and
subsequently switch operation of the propulsion system to the autonomous calibration mode based on the determination that the degree of certainty is above the threshold value.

11. The unmanned vehicle of claim 10, wherein selecting the one or more uncertainty propagation models comprises selecting one or more kinematic models, dynamic models, and/or extrinsic models.

12. The unmanned vehicle of claim 10, wherein the processor is further configured to determine that the enumerated unmanned vehicle capabilities support a performance level threshold, and subsequently enable the guided calibration mode based on the determination that the enumerated unmanned vehicle capabilities satisfies the performance level threshold.

13. The unmanned vehicle of claim 10, wherein the processor is further configured to process the sensor data using one or more uncertainty propagation models to determine the degree of certainty of one or more of: a respective calibration of a relationship between uncertainty on sensor measurements with respect to the position of the chassis; a respective location of each of the one or more sensors with respect to the chassis; a respective orientation of each of the one or more sensors with respect to the chassis; and, one or more of respective shapes and respective location of sensed features.

14. The unmanned vehicle of claim 10, wherein the one or more sensors comprise on or more of: cameras, LIDAR (Light Detection and Ranging) devices, laser sensing devices, radar devices, accelerometers, and magnetometers.

15. The unmanned vehicle of claim 10, wherein the threshold value comprises a respective constraint on one or more of: a control algorithm, a mapping algorithm, a localization algorithm, at least one performance capability, and at least one current probability distribution.

16. An unmanned vehicle comprising:
a chassis;
a communication interface; and
a processor for controlling a propulsion system of the unmanned vehicle and receiving sensor data from one or more sensors of the unmanned vehicle, the processor is configured to:
 enumerate one or more unmanned vehicle capabilities by querying one or more of the propulsion system and the one or more sensors of the unmanned vehicle;
 in the guided calibration mode, while controlling the propulsion system according to commands received via the communications interface from an external guided control system, select one or more uncertainty propagation models from a plurality of uncertainty propagation models based on at least one of i.) one or more unmanned vehicle capabilities and ii.) the sensor data and, process the sensor data using the one or more uncertainty propagation models to determine at least one degree of certainty on a calibration of one or more of the sensor data and a position of the chassis;
 determine that the degree of certainty is above a threshold value associated with a safe operation of the propulsion system in an autonomous calibration mode; and
 subsequently switch operation of the propulsion system to the autonomous calibration mode based on the determination that the degree of certainty is above the threshold value.

17. The unmanned vehicle of claim 16, wherein the enumerating the unmanned vehicle capabilities comprises one or more of: receiving sensor capability data; and auto-detecting sensor capability data.

18. The unmanned vehicle of claim 16, wherein the processor is further configured to determine that the enumerated one or more unmanned vehicle capabilities support a performance level threshold, and subsequently enable the guided calibration mode based on the determination that the enumerated one or more unmanned vehicle capabilities satisfies the performance level threshold.

19. An unmanned vehicle comprising:
a chassis;
a communication interface; and
a processor for controlling a propulsion system of the unmanned vehicle and receiving sensor data from one or more sensors of the unmanned vehicle, the processor configured to:
 in a guided calibration mode, while controlling the propulsion system according to commands received via the communications interface from an external guided control system, select one or more uncertainty propagation models from a plurality of uncertainty propagation models based on at least one of i.) one or more unmanned vehicle capabilities and ii.) the sensor data and, process the sensor data using the one or more uncertainty propagation models to determine at least one degree of certainty on a calibration of one or more of the sensor data and a position of the chassis;
 automatically switch operation of the propulsion system to an autonomous calibration mode when the degree of certainty is above a first threshold value associated with a safe operation of the propulsion system in the autonomous calibration mode;
 in an autonomous calibration mode, while automatically controlling the propulsion system to move the chassis, collecting the sensor data from the one or more sensors; and further processing the sensor data using the one or more uncertainty propagation models to determine at least one further degree of certainty on the calibration; and
 automatically switch operation of the propulsion system to an operational mode when the further degree of certainty is above a second threshold value greater than the first threshold value.

20. The unmanned vehicle of claim 19, wherein selecting the one or more uncertainty propagation models comprises selecting one or more kinematic models, dynamic models, and/or extrinsic models.

* * * * *